March 12, 1968    A. S. CAMPBELL ET AL    3,372,572
DOUBLE-TURNTABLE TYPE DYNAMIC TEST APPARATUS
Filed Aug. 22, 1966    5 Sheets-Sheet 1

Albert S. Campbell
Glenn C. Wright,
INVENTORS.

Albert S. Campbell
Glenn C. Wright,
INVENTORS.

March 12, 1968  A. S. CAMPBELL ETAL  3,372,572
DOUBLE-TURNTABLE TYPE DYNAMIC TEST APPARATUS
Filed Aug. 22, 1966  5 Sheets-Sheet 3

Albert S. Campbell
Glenn C. Wright,
INVENTORS.

March 12, 1968     A. S. CAMPBELL ET AL     3,372,572
DOUBLE-TURNTABLE TYPE DYNAMIC TEST APPARATUS
Filed Aug. 22, 1966     5 Sheets-Sheet 5

Albert S. Campbell
Glenn C. Wright,
INVENTORS.

United States Patent Office 3,372,572
Patented Mar. 12, 1968

3,372,572
DOUBLE-TURNTABLE TYPE DYNAMIC
TEST APPARATUS
Albert S. Campbell and Glenn C. Wright, Las Cruces,
N. Mex., assignors to the United States of America as
represented by the Secretary of the Army
Filed Aug. 22, 1966, Ser. No. 574,508
6 Claims. (Cl. 73—1)

The invention described herein is subject to the reservation to the Government of a non-exclusive, irrevocable, royalty-free license in the invention with power to grant licenses for all governmental purposes.

This invention relates to a dynamic test apparatus and more particularly to test apparatus of the double-turntable type commonly used for dynamically testing certain types of measuring instruments; for example: accelerometers, gyros, pressure-pickups and the like devices which are designed to measure accelerations or which are sensitive to acceleration. Apparatus according to the present invention may also be used in calibrating various type instruments, e.g., accelerometers which sense low frequency accelerations.

The prior art double-turntable, illustrated in FIGURE 1, is based on the circular motion of a first or primary turntable and a second or secondary turntable coupled to the primary turntable in such manner that the specimen which is mounted on the secondary turntable is maintained in the same longitudinal direction A (FIGURE 2) throughout any degree of rotation of the primary turntable, thereby resulting in a sinusoidal motion of the specimen in direction B (FIGURE 2). Such prior art double-turntables have disadvantages which cause distortion of the sinusoidal motion of the specimen and/or inject vibration and flutter effects, commonly referred to in the art as "noise." Among these disadvantages, the most notable is the non-smooth motion of the specimen. The major reason for the non-smooth motion is that the belt-coupling between the pulley of the secondary turntable and the center-drive pulley of the primary turntable is not sufficiently positive, even with the use of timing chains such as could be obtained from a non-flexible gear drive. Another major problem is that the specimen, performing a relative turning motion with respect to the primary turntable, cannot be balanced satisfactorily. Thus, the counterweight mounted directly to the primary turntable does not turn while the test specimen mounted on the secondary turntable turns with respect to the primary turntable. For this reason, the specimen shifts its center of gravity with respect to the center of the primary turntable and causes unbalance. The present invention provides an improved double-turntable apparatus which overcomes the above described disadvantages.

Accordingly, a primary object of the present invention is to provide an improved double-turntable type dynamic test apparatus.

Another object of the present invention is to provide, in a double-turntable apparatus, a novel coupling and drive arrangement between the primary and the secondary turntables having the advantage that the test specimen will not be required to maintain a single direction when in circular motion as in prior art devices.

A further object of the present invention is to provide a double-turntable apparatus having the advantage wherein the secondary turntable may have its position adjusted relative to the primary turntable to vary the turn-radius of the specimen without requiring adjustment of the drive means therefor.

A still further object of the present invention is to provide a double-turntable apparatus having a variable drive arrangement which provides positive, "noiseless" transmission of power (torque) and uniform motion through all revolutions of the apparatus.

Another object of the present invention resides in the provision of a double-turntable wherein the primary turntable may be selectively driven either about its periphery or about its axis without effecting the drive of the secondary turntable.

Other objects, features and advantages of the present invention will become apparent from the following detailed description taken in conjunction with the accompanying drawings, wherein.

Figure 2:
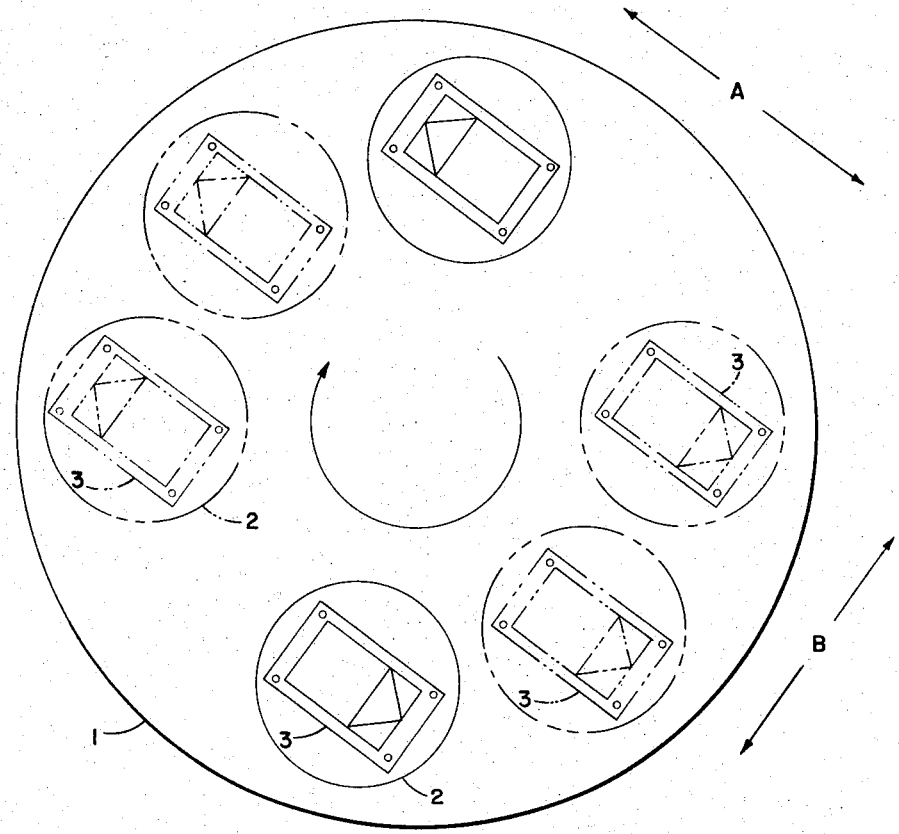
FIGURE 2 is a plan view of the prior art apparatus similar to FIGURE 1 with the counterweight removed and illustrating various relative positions (in phantom) of the two turntables and the specimen while in a circular motion under test conditions.
Figure 1:
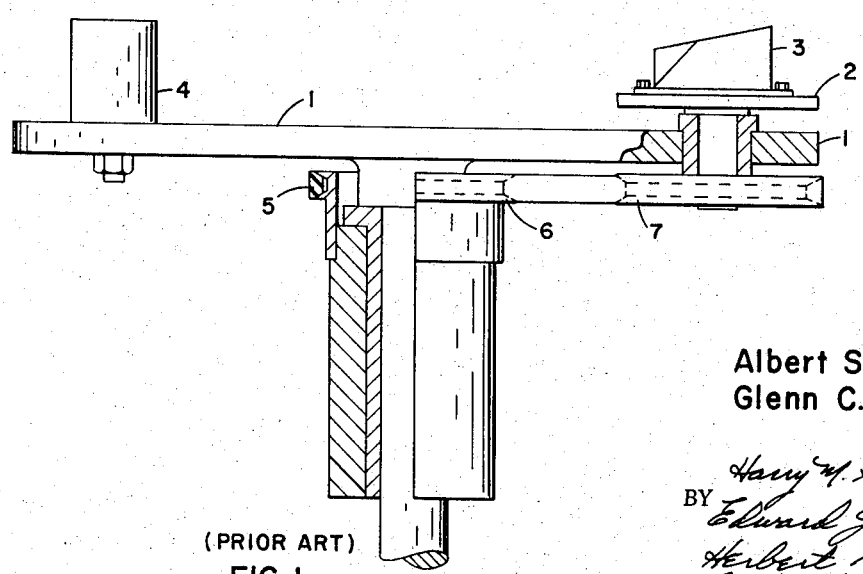
FIGURE 1 is an embodiment of a prior art double-turntable apparatus with portions thereof broken away.

The prior art double-turntable apparatus, illustrated in FIGURES 1 and 2, includes a first or primary turntable 1 mounted vertically and a second or secondary turntable 2 pivotally supported for rotation on the primary turntable near the periphery thereof. A counterweight 4 is rigidly secured on turntable 1 diametrically opposite turntable 2. The turntables are driven as by drive belt 5 and pulleys 6, 7. As illustrated in phantom in FIGURE 2, the test specimen, positioned on turntable 2, maintains the same longitudinal direction A (FIGURE 2) throughout any degree of rotation of the primary turntable. Hence, this arrangement results in a sinusoidal motion of the specimen in directions B (FIGURE 2). Moreover, in this prior art apparatus, the motion of the specimen during tests is not smooth since the drive arrangement including belt coupling 5 and pulleys 6 and 7 is not sufficiently positive. Also, the specimen, performing a relative turning-motion on the primary turntable, cannot be balanced satisfactorily because the counterweight does not turn while the test specimen turns with respect to turntable 1. Hence, the center of gravity of the specimen shifts with respect to the center of turntable 1 and causes unbalance. Accordingly, the sinusoidal motion of the specimen is distorted; and vibration and flutter effects, commonly known in the art as "noise," are injected.

Figure 3:
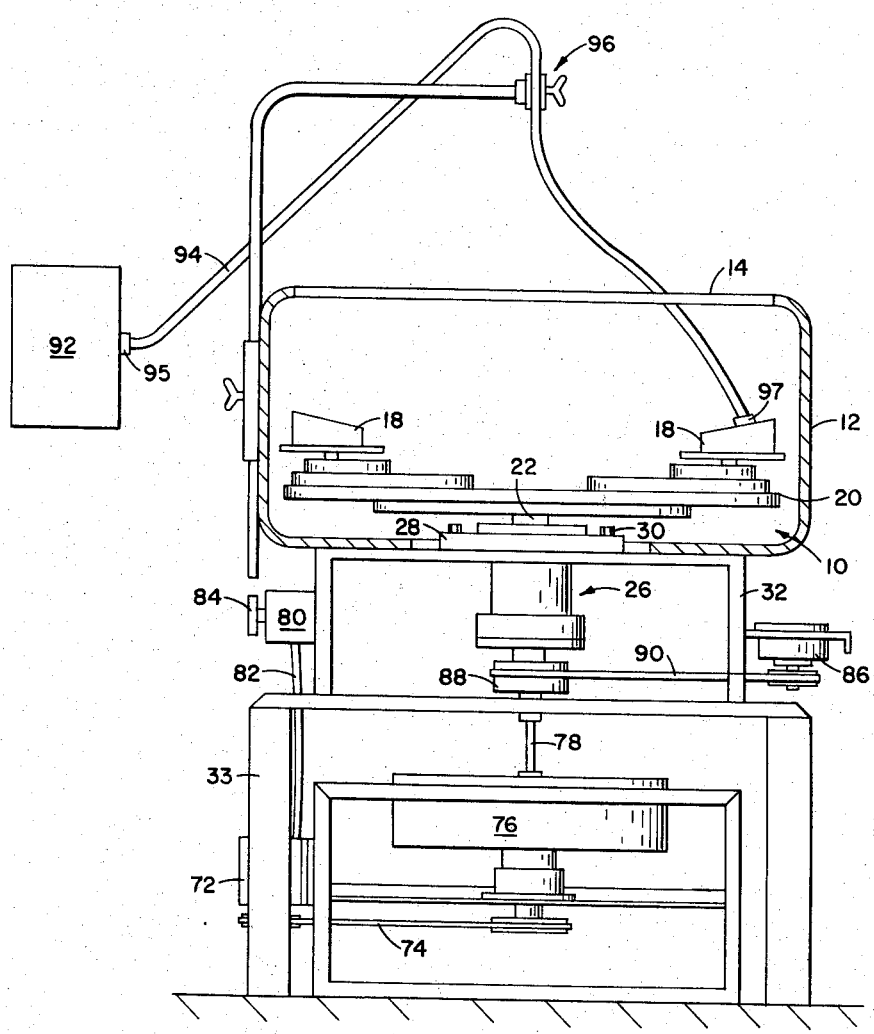
FIGURE 3 is a side elevation of the double-turntable apparatus according to the present invention, the housing thereof being shown in section to depict a test specimen on the secondary turntable and electrically connected to a measuring instrument.
Figure 4:
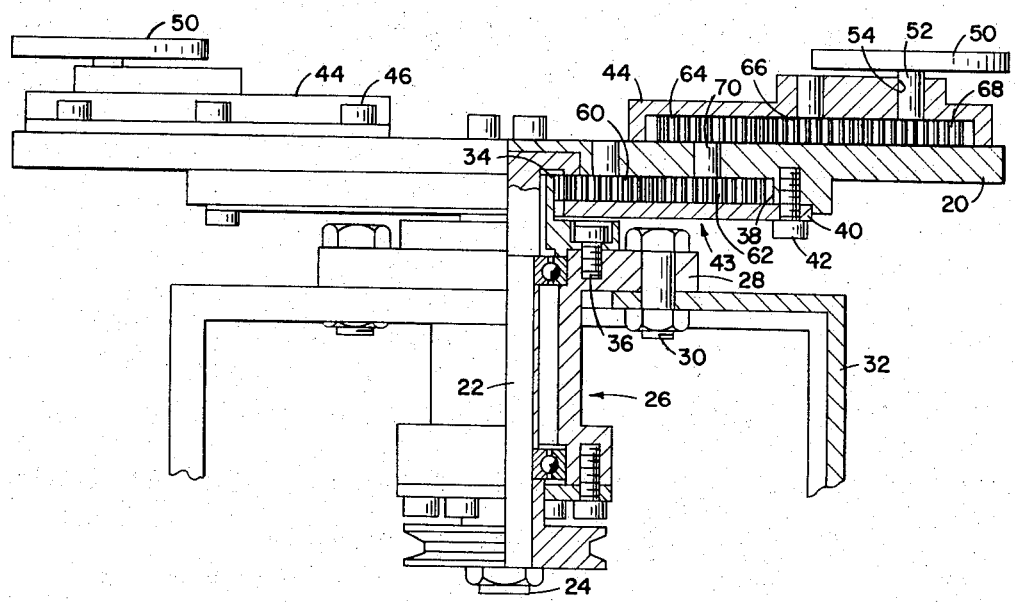
FIGURE 4 is an enlarged detail view, partially in section, of the double-turntable apparatus illustrating the novel drive arrangement between the two turntables of the apparatus.

Referring to FIGURE 3, there is shown a preferred embodiment of the instant invention including a double-turntable apparatus 10 positioned within a cylindrical housing 12 having an opening 14 formed in the upper end thereof. Referring now in detail to FIGURE 4, the double-turntable apparatus includes a primary turntable 20 having a shaft 22 extending coaxially therefrom. To mount the turntable for rotation about a vertical axis, shaft 22 is supported coaxially within a bearing assembly 26. The bearing assembly has on its upper end a radial flange 28 secured as by bolts 30 to a support frame 32. Suitable drive means to be described may be operatively connected with the lower end 24 of shaft 22 for rotating the turntable. An annular gear 34 is secured as by screws 36 to the upper side of bearing assembly flange 28. The lower side of the primary turntable is formed with an annular recess 38 which with removable plate 40 secured thereto as by screws 42 defines a primary gear housing 43. A pair of secondary gear housings 44 are secured as by a plurality of screws 46 on the upper face of the primary turntable. Gear housings 44 are disposed on the primary turntable in diametrically opposed positions, i.e., the pivot axis (FIGURE 5) of each housing 44 is disposed on a common diameter of the turntable. A pair of secondary turntables 50 are provided for supporting test specimen 18 (FIGURE 3). Each secondary turntable has an axial shaft 52 mounted for rotation about a vertical axis within a bore 54 in a respective secondary gear housing.

To adapt each of the secondary turntables for rotation with the primary turntable and for rotation relative to the primary turntable, a series of intermeshing gears are provided (FIGURE 4). Thus, gears 60 and 62 are disposed in primary gear housing 43, and gears 64, 66 and 68 are disposed within secondary gear housing 44. Since the drive arrangement is the same for each of the pair of secondary turntables, the description will be limited to the drive for only one of the secondary turntables. It is noted that the drive for only one of the secondary turntables is shown in FIGURE 4 for simplification. As depicted in FIGURE 4, gear 60 meshes with fixed gear 34 and with gear 62. Gear 62 is directly connected through common shaft 70 for transmitting the driving force to gear 64. In addition, shaft 70 also functions as a pivot shaft for the entire secondary gear housing as will be described hereinafter. Power is transmitted from gear 64 through intermediate gear 66 to drive gear 68, the latter gear being directly connected with shaft 52 of the secondary turntable for rotating the same. Hence, the driving power and motion from gear 62 is transmitted through pivot shaft 70 and gears 64, 66 and 68 to secondary turntable 50.

Figure 5:
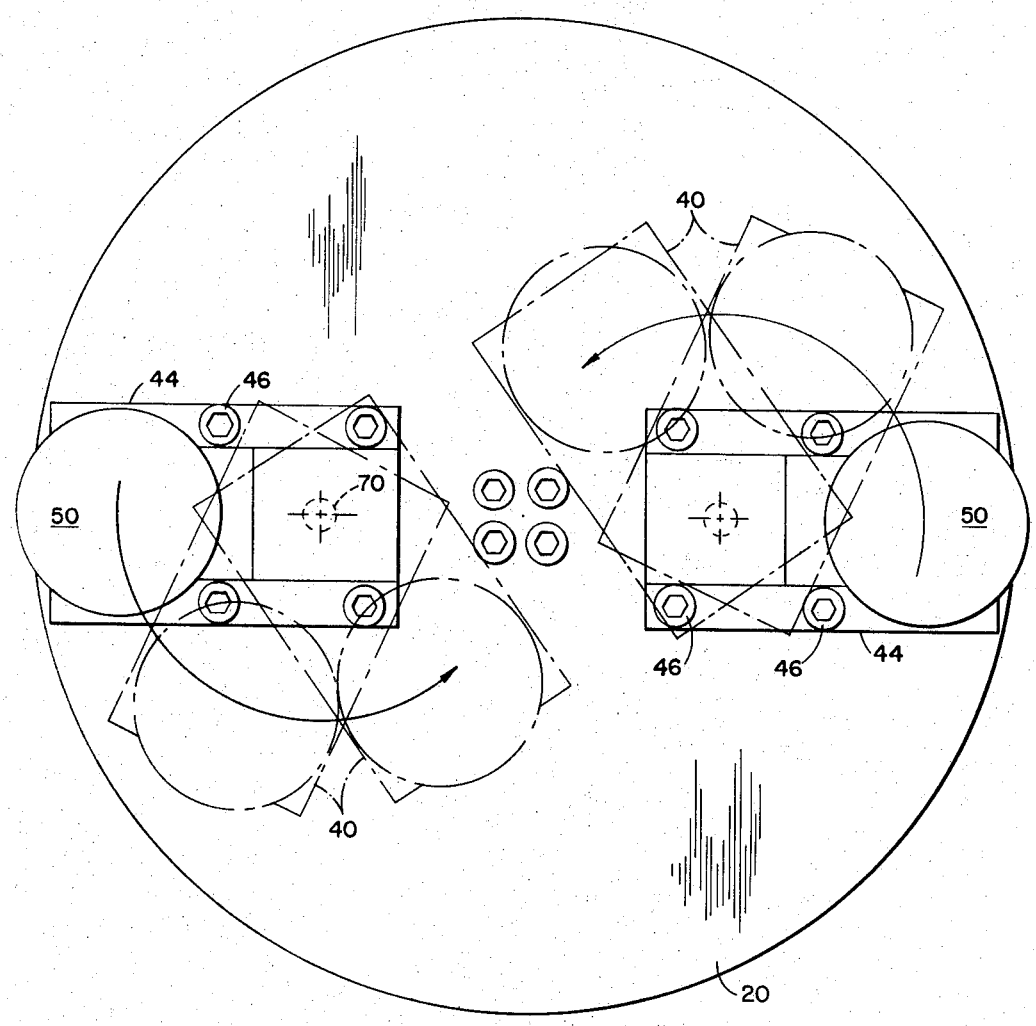
FIGURE 5 is a plan view of the turntable apparatus of FIGURE 4, illustrating the various, relative positions of the two secondary turntables and their respective gear housings with respect to the primary turntable.

An important feature of the present invention resides in the provision that each gear housing 44 is adjustable between a plurality of positions (FIGURE 5) about its pivot shaft 70. As illustrated in FIGURE 5, the two pivot shafts 70 are located on a common diameter of the primary turntable, i.e., each gear housing 44 is normally disposed initially with its longitudinal axis extending along this common diameter. Thus, each gear housing 44 may be positioned on the upper surface of the primary turntable with its longitudinal axis extending at varying angles from said common diameter. To vary the position of a respective gear housing, the same is merely pivoted about its pivot shaft 70, and securing means 46 are relocated accordingly. In this manner, the effective radius of turntable 50 (and the test specimen supported thereon) with respect to the center of turntable 20 may be varied, as depicted in phantom in FIGURE 5. For example, by moving housings 44 in the direction of the arrows, the turn-radius of the respective secondary turntable is shortened. Therefore, it is apparent that each of the pivot shafts 70 serves two distinct functions: (1) providing pivot means for each gear housing 44, and (2) providing means for transmitting the driving power and motion from gear 62 through gears 64, 66 and 68 to the respective secondary turntable.

In the preferred embodiment of the invention (FIGURE 3), the double-turntable apparatus is mounted for operation within housing 12 which is secured to frame 32. To rotate the turntables, an electric motor 72, secured for support to frame 33, is connected as by a flexible drive belt 74 and suitable pulleys for driving the lower end of shaft 22. A flywheel 76 is rotatably supported within frame 33 and a steel torsion wire 78 interconnects, as by setscrews (not shown), the flywheel shaft and the lower end of shaft 22.

The speed of the electric motor may be controlled by a variable power supply 80 connected as by cable 82 to the motor, the power supply being adapted for manual adjustment by handle 84. For example, the power supply may be a variable transformer for AC motors or a rheostat for DC motors. In order that the operator may observe the speed (r.p.m.) of the turntable apparatus throughout the test, a tachometer 86 is conveniently mounted on frame 32 and drivingly connected with pulley 88 by flexible means 90.

The specimen under test is connected electrically with a conventional measuring instrument panel 92 as by a flexible cable 94 and a pair of connectors 95, 97. Since the test specimen does not turn about its own axis, but merely performs a circular motion, no slide rings are required. Consequently, a fixed holding clamp means 96 is suitable for holding connecting cable 94, which extends through enlarged opening 14 in housing 12, clear of the parts in motion. When the double-turntable apparatus is in operation, protective housing 12 functions as a safety device. Thus, if a test specimen should leave the secondary turntable, the specimen would be retained within the housing.

In operation of the preferred embodiment of the invention (FIGURE 3), a test specimen is secured in position on one of the secondary turntables while a second, similar test specimen is positioned on the other, secondary turntable. In practice, the second specimen may be an inoperative or a "dummy" instrument so long as the latter has the same properties as the test specimen, i.e., the same properties with respect to physical dimensions and weight distribution to perfectly counterbalance the test specimen. Cable 94, extending from a measuring instrument panel 92, is then connected to the test specimen by suitable connector means 95, 97. The apparatus is placed in operation by energizing the electric motor. The speed of the motor is controlled as desired by the variable control device. Thus, power torque may be transmitted up to the torque strength of the torque wire which couples the primary turntable shaft and the flywheel. Due to the effect of the separately supported flywheel, the drive transmits a smooth (noiseless) torque to the double turntable and maintains a constant speed (r.p.m.) over predetermined length of time. Thus, the friction (belt) drive combined with the positive power torque of the direct connected wire and employment of a separately mounted flywheel provides a positive drive arrangement which maintains a uniform motion of the double turntable during a single individual revolution or a number of revolutions. In addition, the unique geared drive arrangement for the two turntables (FIGURE 4) allows the test specimen to rotate relative to the primary turntable thereby overcoming a major disadvantage of prior art devices wherein the test specimen always pointed in the same direction while in a circular motion. Thus, a truly sinusoidal motion substantially free from distortions is effected.

It should be apparent that the secondary turntables may be readily adjusted by adjustably positioning the secondary gear housings (FIGURE 5). By this means, the effective radius of the secondary turntables, and the specimen carried thereon, with respect to the center of the primary turntable may be varied as desired.

Figure 6:
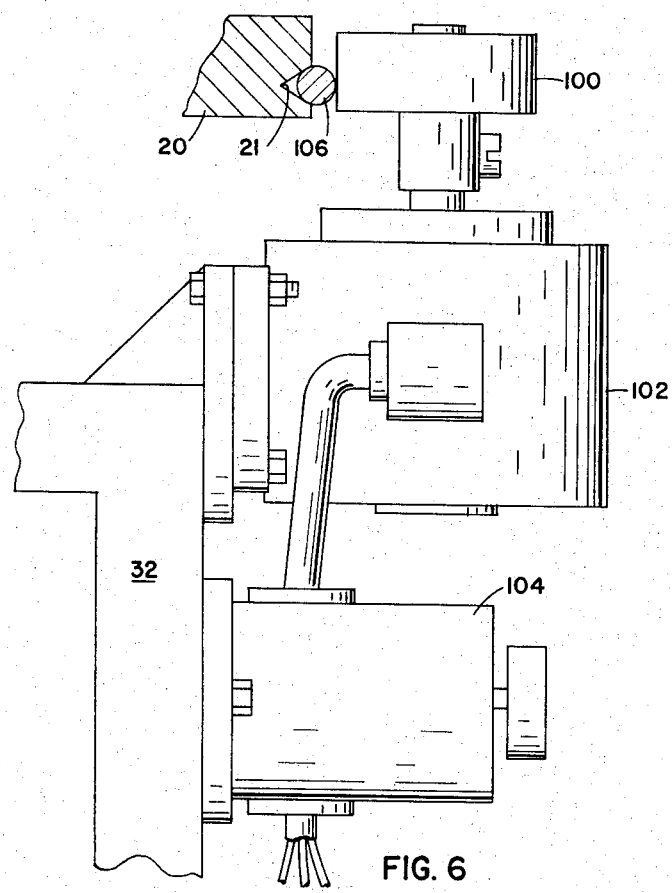
FIGURE 6 is an enlarged elevation view, partially in section, illustrating an electrically-powdered friction drive arrangement for the turntables.

A further embodiment of the invention, depicted in FIGURE 6, includes a modified drive arrangement for the turntables. In this arrangement, a friction drive wheel 100, secured directly to the shaft of an electric motor 102 and having a variable control 104 connected therewith, engages an O-ring 106 disposed in an annular groove 21 in the periphery of the primary turntable, thus, providing a friction drive arrangement. Due to the flywheel effect and the friction drive, this drive arrangement provides uniformity of each revolution of the turntable. In addition, this arangement is particularly adapted for use wherein relatively slow changes of speed are required during operation to obtain certain desired results.

Figure 7:
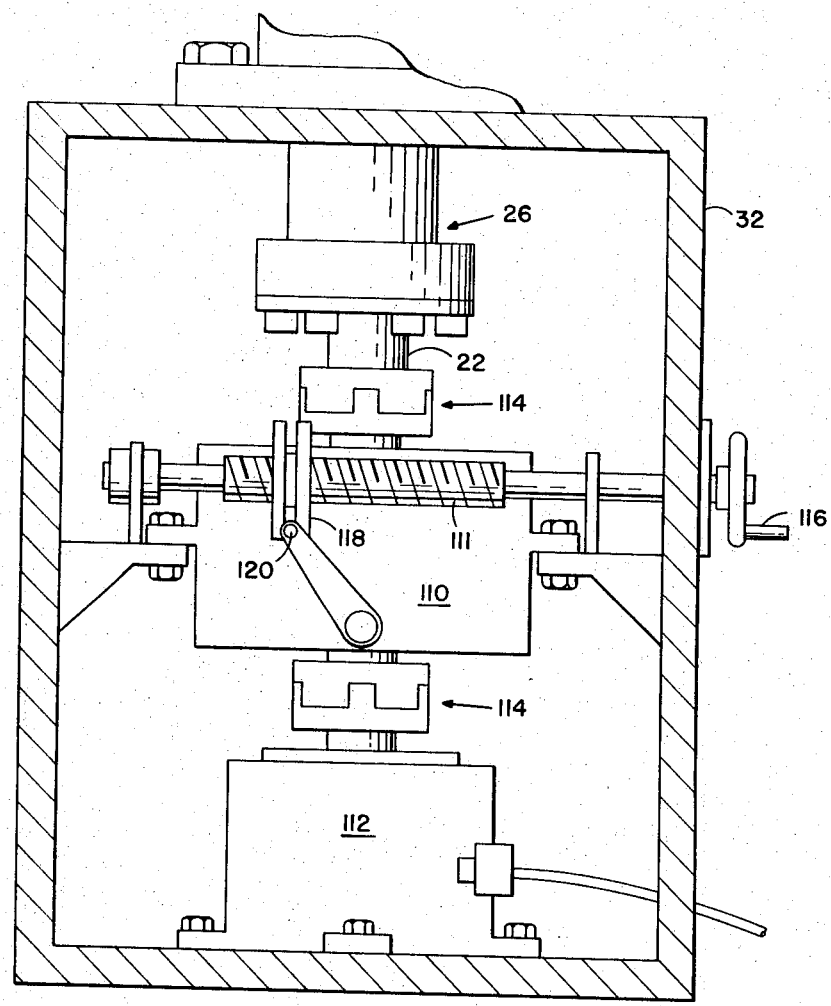
FIGURE 7 is a side elevation of a further embodiment of the invention illustrating a variable hydraulic coupling type drive arrangement for the turntables.

Another embodiment of the invention includes an hydraulic drive arrangement (FIGURE 7). In this arrangement, a variable hydraulic gear 110 is connected intermediate the primary turntable shaft and an electric motor 112 by a pair of cross-couplings 114. By rotating the control lever 116, the speed, as well as the direction of rotation, of the turntable may be varied as desired. Adjustment is effected by merely rotating shaft 111 by lever 116 thereby moving shoulder-nut 118 along the shaft by pushing or pulling the same on pin 120. This manner of control of the hydraulic gear prevents abrupt changes of the direction of rotation and/or the speed (r.p.m.) of the turntables. Thus, the variable hydraulic drive arrangement provides transfer of high power (torque), precision adjustment of the desired speed of the double-turntable, and assurance that changes in the direction of motion of the double-turntable will be performed slowly.

Accordingly, it is seen that the invention provides an improved double-turntable apparatus which features noiseless and positive drive, perfect balancing of the weight of the specimens mounted on the table, variation of the speed of the table, and variation of the turn-radius of the test specimen on the table without requiring adjustment of the turntable drive. While the invention has been described as a dynamic test apparatus of the double-turntable type, the same is useful as a test centrifuge.

It is to be understood that the invention is not limited to the specific embodiment herein illustrated and described but may be used in other ways without departure from its spirit as defined by the appended claims.

What is claimed is:

1. Dynamic test apparatus including: a support frame; a bearing assembly secured within the upper portion of said frame; an annular, fixed gear having teeth on its outer periphery and having a radial flange secured to the upper side of said bearing assembly; a primary turntable having an axial shaft rotatably journaled within said bearing assembly, said turntable being thereby disposed for rotation about a vertical axis, said turntable having a pair of diametrically opposed bores extending vertically therethrough equidistantly spaced from the axis thereof; an annular, centrally disposed, primary gear housing carried by the lower side of said primary turntable; a first pair of gears disposed within said primary gear housing and engaged with said annular gear on diametrically opposite sides thereof, a second pair of gears disposed within said primary gear housing each engaging a respective one of said first pair of gears; a pair of secondary gear housings detachably secured on the upper side of said primary turntable in diametrically opposed positions, each said secondary gear housing having a vertical bore extending therethrough; a third gear disposed in each secondary gear housing; a drive shaft extending through each of said bores in the primary turntable and interconnecting the respective second and third gears; a fourth gear disposed in each said secondary gear housing and engaging one of said third gears; a fifth gear disposed in each said secondary gear housing and engaging one of said fourth gears; a pair of secondary turntables mounted on said primary turntable for rotation relative thereto and adapted for supporting a test specimen thereon, each said secondary turntable having an axial shaft rotatably journaled in said bore in each said secondary gear housing and drivingly connected with a respective one of said fifth gears; and drive means operatively connected with said primary turntable for rotating said turntables.

2. A dynamic test apparatus as recited in claim 1 and, further including a protective housing secured to said support frame and enclosing the turntables, said protective housing having an enlarged opening in the upper portion thereof allowing a cable, connecting a test specimen and an instrument panel, to extend therethrough while the apparatus is in operation.

3. A dynamic test apparatus as recited in claim 1 wherein said drive means includes: a flywheel supported for rotation about a vertical axis within said support frame; a torsion wire connected intermediate the lower end of the primary turntable shaft and the axis of the flywheel; an electric motor operatively connected with said last-named shaft for rotating the same; and, a variable control device operatively connected with said motor for varying the speed and direction of rotation of the primary turntable.

4. A dynamic test apparatus as recited in claim 1 wherein said drive means includes an electric motor mounted within said support frame and a variable hydrualic gear connected between said electric motor and the lower end of the primary turntable shaft.

5. A dynamic test apparatus as recited in claim 1 wherein the primary turntable is provided with an annular V-shaped groove in the outer periphery thereof; and wherein said drive means includes: an electric motor mounted on said support frame and having a variable control connected therewith, said electric motor having a vertically extending shaft and a friction drive wheel secured on the upper end of said last-named shaft; and a resilient O-ring disposed in said groove for frictional engagement between said groove and said friction drive wheel.

6. A dynamic test apparatus as recited in claim 1 wherein the drive shafts connecting the respective second and third gears are located on a common diameter of the primary turntable and are equidistantly spaced from the center of said primary turntable thereby providing pivot axes for the respective secondary gear housings, the latter said housings being adjustable to a plurality of positions about said pivot axes thereby disposing the longitudinal axis of said secondary gear housings at varying angles from said common diameter and thereby varying the turn-radius of the secondary turntables.

References Cited

UNITED STATES PATENTS 3,011,333    12/1961    Roth _____ 73—1
3,180,131    4/1965    Thompson.

LOUIS R. PRINCE, *Primary Examiner.*

CLEMENT S. SWISHER, *Assistant Examiner.*